(12) United States Patent
Matsushita (10) Patent No.: US 11,397,021 B2
(45) Date of Patent: Jul. 26, 2022

(54) OUTDOOR UNIT, INDOOR UNIT, AND AIR CONDITIONER

(71) Applicant: Mitsubishi Electric Corporation, Tokyo (JP)

(72) Inventor: Shinya Matsushita, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 0 days.

(21) Appl. No.: 17/262,549

(22) PCT Filed: Oct. 3, 2018

(86) PCT No.: PCT/JP2018/037071
§ 371 (c)(1),
(2) Date: Jan. 22, 2021

(87) PCT Pub. No.: WO2020/070833
PCT Pub. Date: Apr. 9, 2020

(65) Prior Publication Data
US 2021/0293438 A1    Sep. 23, 2021

(51) Int. Cl.
| *F24F 11/64* | (2018.01) |
| *F24F 1/16* | (2011.01) |
| *F24F 1/24* | (2011.01) |
| *F24F 1/38* | (2011.01) |
| *F24F 1/10* | (2011.01) |
| *F24F 1/32* | (2011.01) |

(52) U.S. Cl.
CPC ............... *F24F 11/64* (2018.01); *F24F 1/16* (2013.01); *F24F 1/24* (2013.01); *F24F 1/38* (2013.01); *F24F 1/10* (2013.01); *F24F 1/32* (2013.01)

(58) Field of Classification Search
CPC ..... F24F 11/64; F24F 1/24; F24F 1/38; F25B 49/02
See application file for complete search history.

(56) References Cited

U.S. PATENT DOCUMENTS

| 2017/0292733 A1 | 10/2017 | Uemura et al. | |
| 2017/0302201 A1* | 10/2017 | Saito | .......................... H02P 6/10 |
| 2018/0167004 A1* | 6/2018 | Suzuki | ...................... H02P 6/08 |

FOREIGN PATENT DOCUMENTS

| CN | 106687751 A | 5/2017 |
| JP | 2009-243800 A | 10/2009 |
| JP | 2012-100394 A | 5/2012 |

(Continued)

OTHER PUBLICATIONS

JP2012242037A Translation (Year: 2012).*

(Continued)

*Primary Examiner* — Schyler S Sanks
(74) *Attorney, Agent, or Firm* — Posz Law Group, PLC (57) ABSTRACT

An outdoor unit includes: a heat exchanger to exchange heat between refrigerant and air; a first air blower and a second air blower to blow air on the heat exchanger; a compressor drive unit to drive a compressor compressing the refrigerant, the compressor drive unit including a power device; a cooling fin to cool the power device; a cooling-fin-temperature detection unit to detect temperature of the cooling fin; and a position determination unit to determine a position of the first air blower and a position of the second air blower by using the temperature of the cooling fin.

10 Claims, 5 Drawing Sheets

(56) References Cited

FOREIGN PATENT DOCUMENTS

| JP | 2012-242037 A | | 12/2012 |
|---|---|---|---|
| JP | 2012242037 A | * | 12/2012 |
| JP | 2013-024537 A | | 2/2013 |
| JP | 2013-057428 A | | 3/2013 |

OTHER PUBLICATIONS

International Search Report of the International Searching Authority dated Jan. 15, 2019 for the corresponding international application No. PCT/JP2018/037071 (and English translation).
Office Action dated Jan. 21, 2022 issued in the corresponding Indian application No. 202127008063 .
Office Action dated Oct. 28, 2021 issued in corresponding Chinese Application No. 201880098035.X ( and English translation).
Office Action dated Mar. 22, 2022 issued in counterpart CN Patent Application No. 201880098035.X (with English machine translation).

* cited by examiner

OUTDOOR UNIT, INDOOR UNIT, AND AIR CONDITIONER

CROSS REFERENCE TO RELATED APPLICATION

This application is a U.S. national stage application of International Patent Application No. PCT/JP2018/037071 filed on Oct. 3, 2018, the disclosure of which is incorporated herein by reference.

TECHNICAL FIELD

The present invention relates to an outdoor unit including two air blowers, an indoor unit including two air blowers, and an air conditioner.

BACKGROUND

Outdoor units of air conditioners (with heater) include air blowers that are used to pass air through heat exchangers. Moreover, airflow generated by an air blower is also used to lower the temperature of a cooling fin. A cooling fin cools power devices that are power semiconductor devices on a compressor drive substrate. An outdoor unit in some cases includes a plurality of air blowers. Patent literature 1 discloses an outdoor unit that includes upper and lower air blowers and in which the upper air blower cools a cooling fin with higher efficiency than the lower air blower. Moreover, the outdoor unit described in Patent Literature 1 cools the cooling fin efficiently by individually controlling the ratio of the number of rotations between the air blowers in accordance with the temperature of the cooling fin.

PATENT LITERATURE

Patent Literature 1: Japanese Patent Application Laid-open No. 2013-24537

However, if the upper and lower air blowers of the outdoor unit described in Patent Literature 1 are disposed the other way round or if the leads connecting the air blowers to the control substrate are connected the other way round, the ratio of the number of rotations between the air blowers is controlled in a vertically reverse manner. This results in insufficient cooling of the power devices on the compressor drive substrate. Thus, there is a problem in that heat generation in the power devices cannot be reduced and the air-conditioning capacity of the air conditioner decreases.

SUMMARY

The present invention has been achieved in view of the above and an object of the present invention is to provide an outdoor unit capable of inhibiting reduction in air-conditioning capacity of an air conditioner.

In order to solve the above problems and achieve the object, an outdoor unit according to aspect of the present invention includes: a heat exchanger to exchange heat between refrigerant and air; a first air blower and a second air blower to blow air on the heat exchanger; a compressor drive unit to drive a compressor compressing the refrigerant, the compressor drive unit including a power device; a cooling fin to cool the power device; a cooling-fin-temperature detection unit to detect temperature of the cooling fin; and a position determination unit to determine a position of the first air blower and a position of the second air blower by using the temperature of the cooling fin.

An outdoor unit according to the present invention provides an effect of inhibiting reduction in air-conditioning capacity of an air conditioner.

DETAILED DESCRIPTION

An outdoor unit, an indoor unit, and an air conditioner according to embodiments of the present invention will be explained below in detail with reference to the drawings. This invention is not limited to the embodiments.

First Embodiment

Figure 1:
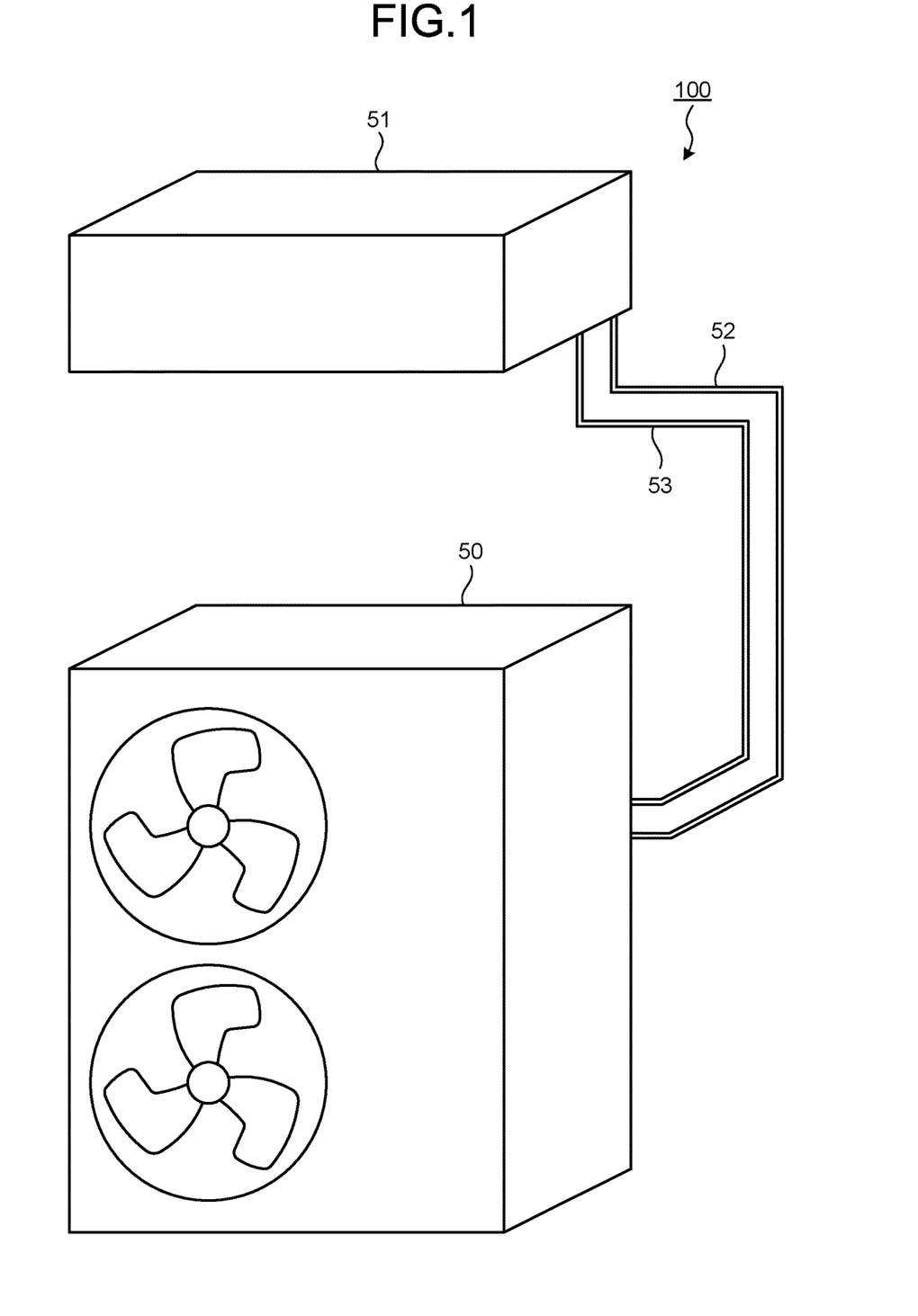
FIG. 1 is a diagram illustrating a configuration of an air conditioner according to a first embodiment.

FIG. 1 is a diagram illustrating a configuration of an air conditioner (with heater) according to a first embodiment. An air conditioner 100 includes an outdoor unit 50 and an indoor unit 51. The outdoor unit 50 and the indoor unit 51 are connected via a gas connection pipe 52 and a liquid connection pipe 53. The gas connection pipe 52 and the liquid connection pipe 53 may be collectively referred to as a refrigerant pipe. The refrigerant pipe is filled with refrigerant, and the refrigerant circulates between the outdoor unit 50 and the indoor unit 51 via the refrigerant pipe, whereby the air conditioner 100 exchanges heat between the indoors and the outdoors.

Figure 2:
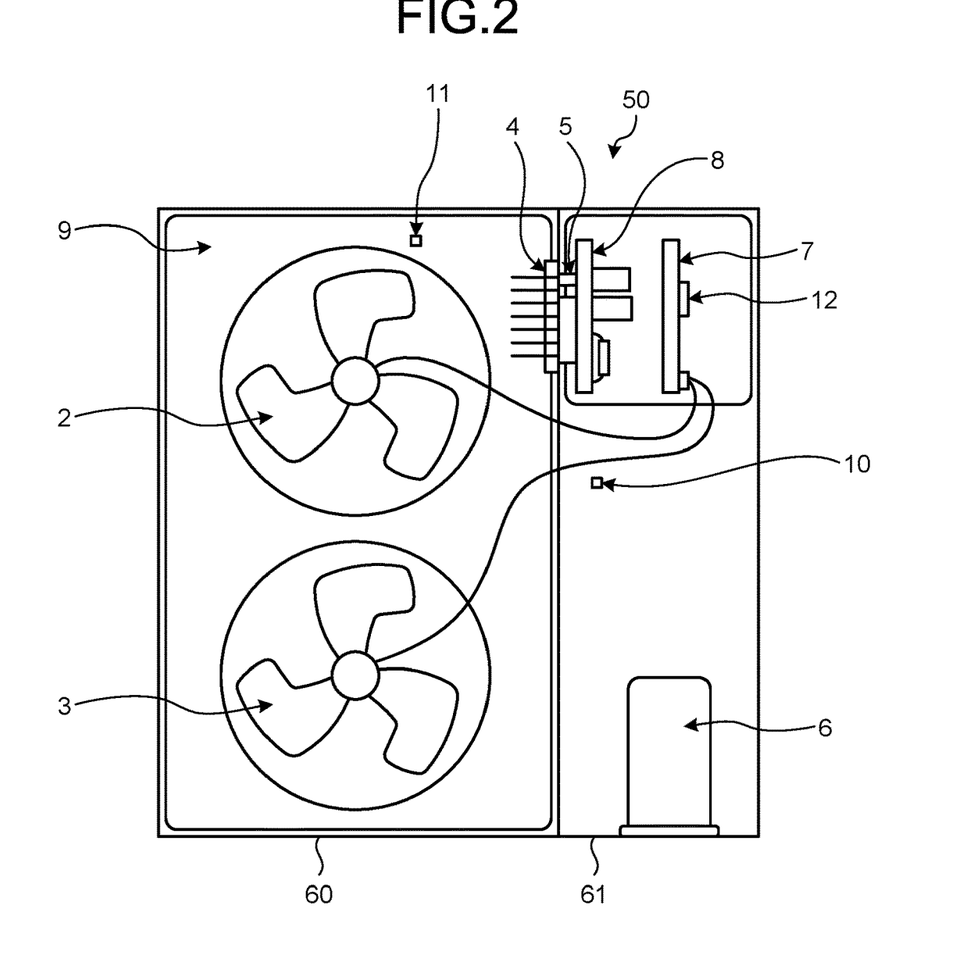
FIG. 2 is a diagram illustrating an internal configuration of an outdoor unit according to the first embodiment.

FIG. 2 is a diagram illustrating an internal configuration of the outdoor unit 50 according to the first embodiment. The outdoor unit 50 includes a first air blower 2, a second air blower 3, a cooling fin 4, a cooling-fin-temperature detection unit 5, a compressor 6, a control substrate 7, a compressor drive substrate 8, a heat exchanger 9, a pipe temperature detection unit 10, an air temperature detection unit 11, and an air-blower-position determination unit 12. The first air blower 2 blows air on the heat exchanger 9. The second air blower 3 is installed below the first air blower 2 and blows air on the heat exchanger 9. Moreover, the first air blower 2 and the second air blower 3 blow air on the cooling fin 4. The first air blower 2 is installed at a position closer to the cooling fin 4 than the second air blower 3. The cooling fin 4 cools power devices of a compressor drive unit. The cooling-fin-temperature detection unit 5 detects the temperature of the cooling fin 4. The compressor 6 compresses refrigerant. The control substrate 7 includes the air-blower-position determination unit 12. The compressor drive substrate 8 includes the compressor drive unit. The compressor drive unit drives the compressor 6 and includes the power devices. The heat exchanger 9 exchanges heat between refrigerant and air. The pipe temperature detection unit 10 detects the temperature of the refrigerant pipe connected to the heat exchanger 9. The air temperature detection unit 11 includes an outside temperature thermistor and detects the outside temperature. The air temperature detection unit 11 is installed at the inlet of the heat exchanger 9. The air-blower-position determination unit 12 determines the positions of the first air blower 2 and the second air blower 3. The air-blower-position determination unit 12 is referred to also as a position determination unit.

The outdoor unit 50 includes an air blower chamber 60 and a machine chamber 61. The first air blower 2 and the second air blower 3 are disposed in the air blower chamber 60. The air temperature detection unit 11 is disposed outside the air blower chamber 60. The cooling-fin-temperature detection unit 5, the compressor 6, the control substrate 7, the compressor drive substrate 8, the pipe temperature detection unit 10, and the air-blower-position determination unit 12 are disposed in the machine chamber 61. As illustrated in FIG. 2, the cooling fin 4 is disposed such that it projects from the machine chamber 61 into the air blower chamber 60. The first air blower 2 and the second air blower 3 are each connected to the control substrate 7 with a lead. Moreover, the first air blower 2 and the second air blower 3 are each supplied with power and a drive signal for driving from the control substrate 7.

The cooling-fin-temperature detection unit 5, the pipe temperature detection unit 10, the air temperature detection unit 11, and the air-blower-position determination unit 12 are implemented by processing circuitry that is electronic circuitry that performs each processing.

The processing circuitry may be dedicated hardware or may be a control circuit that includes a memory and a central processing unit (CPU) that executes programs stored in the memory. Here, the memory corresponds to, for example, a non-volatile or volatile semiconductor memory such as a random access memory (RAM), a read-only memory (ROM), and a flash memory, a magnetic disk, an optical disk, or the like. In the case where the processing circuitry is a control circuit that includes a CPU, the control circuit is, for example, a control circuit 200 having a configuration illustrated in FIG. 3.

Figure 3:
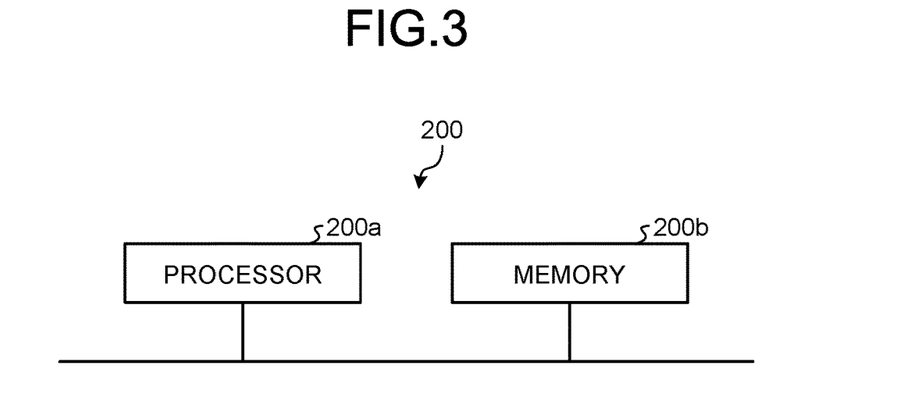
FIG. 3 is a diagram illustrating a control circuit according to the first embodiment.

As illustrated in FIG. 3, the control circuit 200 includes a processor 200a, which is a CPU, and a memory 200b. In the case where the above-described units are implemented by the control circuit 200 illustrated in FIG. 3, these units are implemented by the processor 200a reading and executing the programs corresponding to the respective processing, stored in the memory 200b. The memory 200b is also used as a temporary memory in each processing executed by the processor 200a.

The operation of the outdoor unit 50 will be described. The outdoor unit 50 controls the temperature of the refrigerant and the pressure of the refrigerant by changing the number of rotations of the air blowers. Here, the number of rotations indicates the number of rotations per unit time, i.e., the rotation speed. A greater number of rotations indicates a higher rotation speed, and a smaller number of rotations indicates a lower rotation speed. The refrigerant is compressed by the compressor 6. When it is necessary to exchange more heat between air and the refrigerant, the outdoor unit 50 increases the number of rotations of each of the first air blower 2 and the second air blower 3. In contrast, when it is not necessary to exchange a large amount of heat between air and the refrigerant, the outdoor unit 50 reduces the number of rotations of each of the first air blower 2 and the second air blower 3. Moreover, the outdoor unit 50 can further reduce the heat exchange by stopping the second air blower 3 and operating only the first air blower 2. The first air blower 2 blows air on the cooling fin 4 attached to the power devices of the compressor drive unit to cool the power devices. When the temperature of the power devices of the compressor drive unit is high, the number of rotations of the first air blower 2 is increased to blow air on the cooling fin 4, thereby cooling the power devices and increasing the reliability of the power devices. This means that the first air blower 2 has two roles, i.e., controlling the temperature and pressure of the refrigerant and cooling the power devices of the compressor drive unit.

At the time of product shipment, the first air blower 2 and the second air blower 3 are installed at the defined positions and thus no problem occurs. However, if the first air blower 2 or the second air blower 3 fails or if the control substrate 7 fails, the position of the first air blower 2 and the position of the second air blower 3 may be reversed after component replacement or the like. When heat exchange is performed by using only the first air blower 2 in a state where the position of the first air blower 2 and the position of the second air blower 3 are reversed, air cannot be blown on the cooling fin 4. This results in insufficient cooling of the power devices and may thus lead to thermal destruction of the power devices. For this reason, it is important to install the first air blower 2 and the second air blower 3 at the correct positions. The outdoor unit 50 according to the first embodiment enables determination of the position of the first air blower 2 used for cooling the power devices in a case where the outdoor unit 50 includes a plurality of air blowers.

Figure 4:
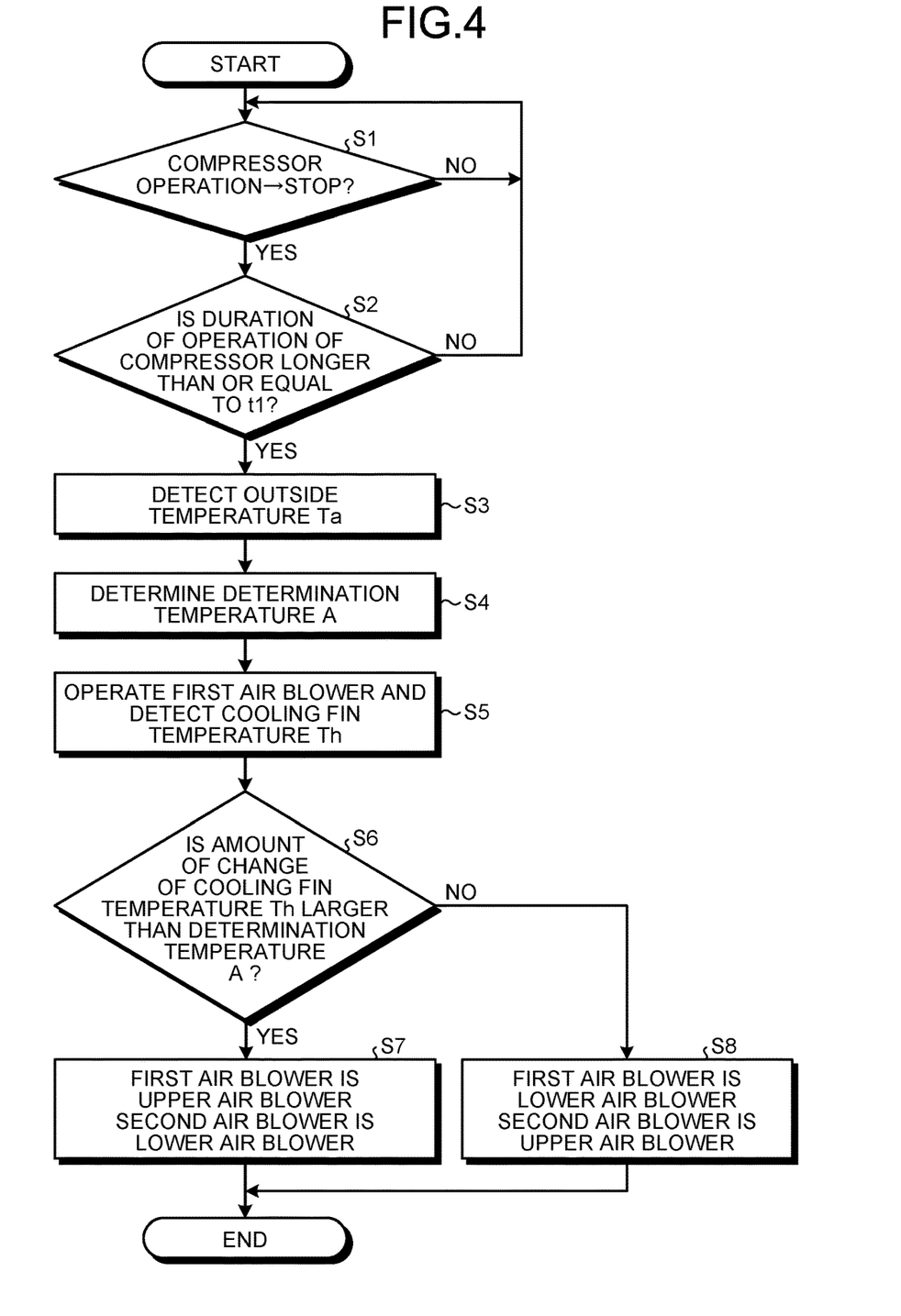
FIG. 4 is a flowchart illustrating an operation of an air-blower-position determination unit according to the first embodiment.

FIG. 4 is a flowchart illustrating the operation of the air-blower-position determination unit 12 according to the first embodiment. The air-blower-position determination unit 12 detects whether the compressor 6 in operation has stopped (Step S1). When the air-blower-position determination unit 12 detects that the compressor 6 in operation has stopped (Yes in Step S1), the air-blower-position determination unit 12 determines whether the duration of operation of the compressor 6 is longer than or equal to t1 (Step S2). The period of time t1 indicates the period of time necessary for the temperature of the power devices of the compressor drive unit to increase sufficiently as a result of continuous operation of the compressor 6 and necessary for the difference between the temperature of the power devices and the outside temperature to become large. When the duration of operation of the compressor 6 is shorter than t1 (No in Step S2), the process returns to Step S1. When the duration of operation of the compressor 6 is longer than or equal to t1 (Yes in Step S2), the air-blower-position determination unit 12 detects outside temperature Ta by using the outside temperature thermistor of the air temperature detection unit 11 (Step S3). The air-blower-position determination unit 12 determines determination temperature A indicating the temperature for determining the positions of the air blowers (Step S4). The determination temperature A is a value obtained by subtracting the temperature of the cooling fin 4 before the compressor 6 operates from the temperature of the cooling fin 4 after the compressor 6 has operated for t1 or longer. In other words, the determination temperature A is the amount of change in the temperature of the cooling fin 4. Moreover, the determination temperature A is the threshold used for determining whether air is blown on the cooling fin 4. The determination temperature A is compared with the amount of change of cooling fin temperature Th indicating the temperature of the cooling fin 4.

Figure 5:
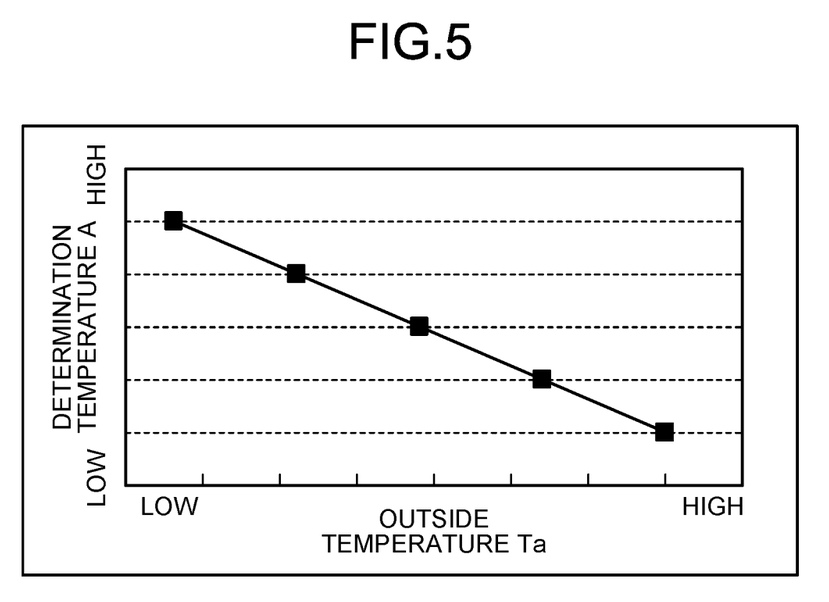
FIG. 5 is a graph illustrating the relationship between determination temperature and outside temperature according to the first embodiment.

The outside temperature Ta and the determination temperature A will be described. FIG. 5 is a graph illustrating the relationship between the determination temperature and the outside temperature according to the first embodiment. In FIG. 5, the vertical axis indicates the determination temperature A and the horizontal axis indicates the outside temperature Ta. As illustrated in FIG. 2, the first air blower 2 brings in the outside air to cool the cooling fin 4; therefore, as the outside temperature Ta increases, the cooling performance of the cooling fin 4 decreases. Thus, as the outside temperature Ta increases, the amount of change in the temperature of the cooling fin 4 decreases. That is, the determination temperature A in the case when the outside temperature Ta is high is lower than the determination temperature A in the case when the outside temperature Ta is low.

The air-blower-position determination unit 12 operates the first air blower 2 and detects the cooling fin temperature Th (Step S5). The air-blower-position determination unit 12 determines whether the amount of change of the cooling fin temperature Th is larger than the determination temperature A (Step S6). When the amount of change of the cooling fin temperature Th is larger than the determination temperature A (Yes in Step S6), the air-blower-position determination unit 12 determines that the first air blower 2 is the air blower installed above the second air blower 3, that is, the air blower placed closer to the cooling fin 4 than the second air blower 3, and determines that the second air blower 3 is the air blower placed below the first air blower 2 (Step S7). When the amount of change of the cooling fin temperature Th is smaller than or equal to the determination temperature A (No in Step S6), the air-blower-position determination unit 12 determines that the second air blower 3 is the air blower installed above the first air blower 2, that is, the air blower placed closer to the cooling fin 4 than the first air blower 2, and determines that the first air blower 2 is the air blower installed below the second air blower 3 (Step S8).

When the compressor 6 stops after continuous operation for a predetermined period of time, the power devices of the compressor drive unit generate heat due to the loss generated during operation and thus the temperature of the power devices becomes higher than the outside temperature. In such a case, by operating the air blower that is installed on the opposite side of the cooling fin 4 to the power devices, air is blown on the cooling fin 4 and the power devices are cooled. As the outside temperature Ta gets lower, the cooling fin temperature Th decreases more sharply. In contrast, as the outside temperature gets higher, the cooling fin temperature Th decreases more gradually. Meanwhile, when the air blower installed in a place around which the cooling fin 4 for the power devices is not installed is operated, air is not blown on the cooling fin 4 and thus the temperature of the cooling fin 4 does not substantially decrease. The air-blower-position determination unit 12 uses the difference in this temperature change to determine the positions of the first air blower 2 and the second air blower 3.

In Step S3, the air-blower-position determination unit 12 may make the determination by using the temperature of the liquid connection pipe 53 instead of the temperature of the cooling fin 4. When the first air blower 2 is operated, the temperature of the liquid connection pipe 53 approaches the outside temperature. The temperature of the liquid connection pipe 53 is detected by the pipe temperature detection unit 10. In this case, the determination temperature A is a value obtained by subtracting the temperature of the liquid connection pipe 53 before the compressor 6 operates from the temperature of the liquid connection pipe 53 after the compressor 6 has operated for t1 or longer. In other words, the determination temperature A is the amount of change in the temperature of the liquid connection pipe 53. When the air-blower-position determination unit 12 makes the determination by using the temperature of the liquid connection pipe 53, the relationship between the outside temperature Ta and the determination temperature A is different depending on the air conditioning settings of the air conditioner 100. When the air conditioner 100 is set to heating mode, the temperature of the liquid connection pipe 53 is lower than the outside temperature. Thus, the outside temperature Ta and the determination temperature A have an inverse relationship as illustrated in FIG. 5.

Figure 6:
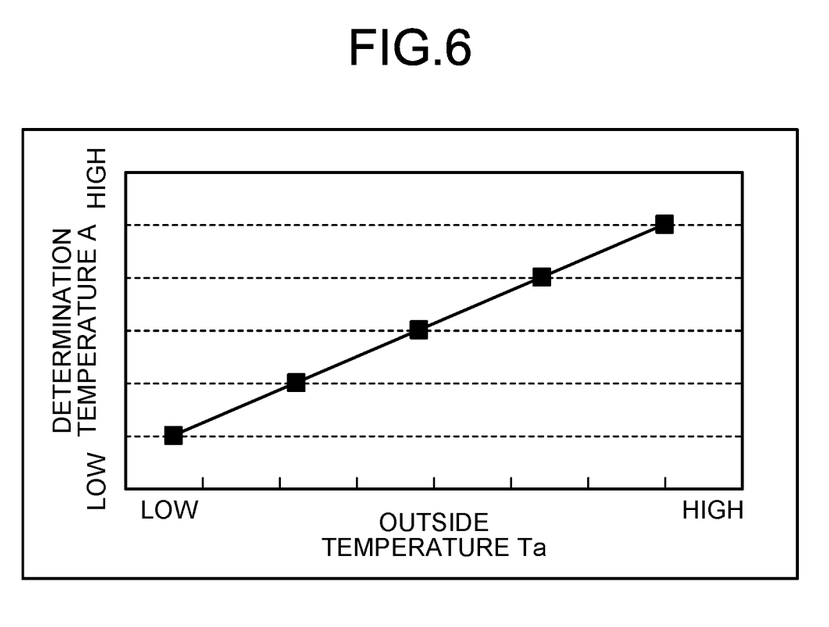
FIG. 6 is a graph illustrating another example of the relationship between determination temperature and outside temperature according to the first embodiment.

FIG. 6 is a graph illustrating another example of the relationship between the determination temperature and the outside temperature according to the first embodiment. When the air conditioner 100 is set to cooling mode, the temperature of the liquid connection pipe 53 is higher than the outside temperature. Thus, the outside temperature Ta and the determination temperature A have a direct relationship as illustrated in FIG. 6. When the temperature of the liquid connection pipe 53 is used to make the determination, t1 is the period of time necessary for the temperature of the liquid connection pipe 53 to change sufficiently as a result of continuous operation of the compressor 6 and necessary for the difference between the temperature of the liquid connection pipe 53 and the outside temperature to become large.

The cooling fin 4 may be disposed not to project into the air blower chamber 60, and the configuration may be such that the cooling fin 4 is cooled by the air drawn from the machine chamber 61 side through a duct by any of the air blowers installed in the air blower chamber 60. When the output frequency of the compressor 6 is low, the characteristics in the graphs between the outside temperature and the determination temperature A illustrated in FIGS. 5 and 6 cannot be satisfied in some cases. For this reason, the determination may be made only when the compressor 6 operates with frequency f or higher. The frequency f is, for example, the lower limit of the frequency of the compressor 6 within the range within which the characteristics in the graphs illustrated in FIGS. 5 and 6 are satisfied. It is satisfactory if the frequency f is determined based on the frequency of the compressor 6 that satisfies the characteristics in the graphs illustrated in FIGS. 5 and 6, and is not limited to the lower limit described above. The frequency f may be, for example, a value higher than the lower limit described above.

Examples of a method of determining the position of the first air blower 2 and the position of the second air blower 3 include a method of differentiating between the shapes of the connectors connecting the respective air blowers to the control substrate 7 and a method of differentiating between the attachment structures of the air blowers. However, the above methods cause the air blowers to have different specifications and thus the air blowers cannot share specifications in common, which leads to an increase in costs and complexity of parts management due to the differentiation. However, with the air-blower-position determination unit 12 of the outdoor unit 50 according to the first embodiment, the first air blower 2 and the second air blower 3 can have common specifications; therefore, the cost can be reduced and the parts management can be simplified.

As described above, with the outdoor unit 50 according to the present embodiment, the air-blower-position determination unit 12 can regularly determine the position of the first air blower 2 that blows air on the cooling fin 4. Thus, even when the air blowers are replaced and, as a result, the position of the first air blower 2 and the position of the second air blower 3 are reversed, the air-blower-position determination unit 12 can determine the positions of the air blowers and can switch control between the first air blower 2 and the second air blower 3. Moreover, even when the first air blower 2 and the second air blower 3 are individually controlled, the power devices can be cooled by allowing the air-blower-position determination unit 12 to switch control. Consequently, the reliability of the power devices of the compressor drive unit can be prevented from degrading. Therefore, reduction in air-conditioning capacity of the air conditioner 100 can be inhibited.

Second Embodiment

A description will be given of an operation of determining the positions of the air blowers in the indoor unit of the air conditioner according to a second embodiment. Components having the same functions as those in the first embodiment are denoted by the same reference symbols as those in the first embodiment and duplicate descriptions will be omitted.

Figure 7:
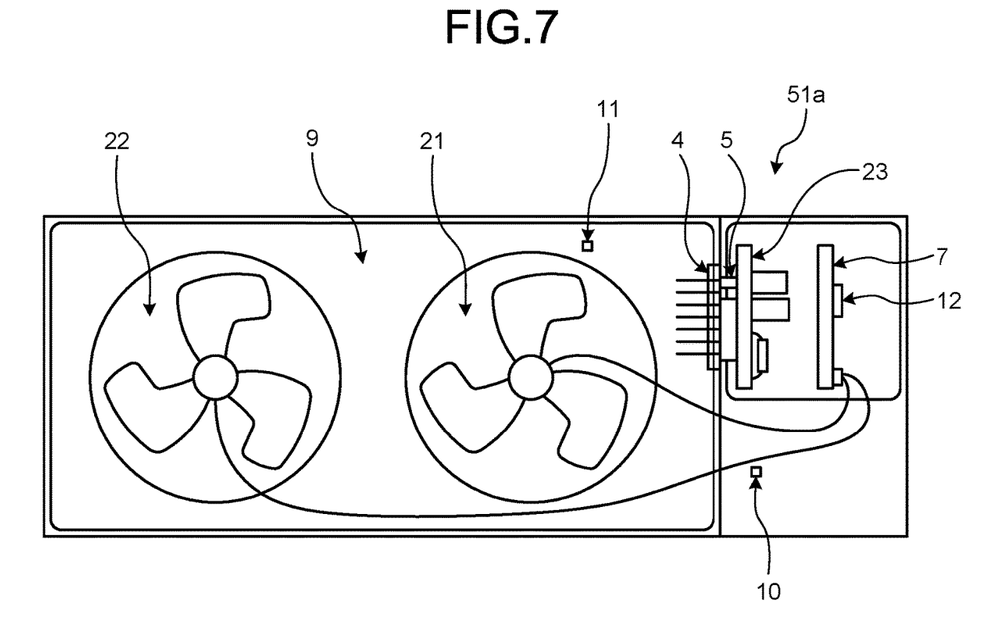
FIG. 7 is a diagram illustrating an internal configuration of an indoor unit according to a second embodiment.

FIG. 7 is a diagram illustrating an internal configuration of an indoor unit according to the second embodiment. The configuration of an indoor unit 51a is different from that of the outdoor unit 50 in that the indoor unit 51a includes a third air blower 21 instead of the first air blower 2 and includes a fourth air blower 22 instead of the second air blower 3. Further, the indoor unit 51a includes an air blower drive substrate 23 instead of the compressor drive substrate 8. The air blower drive substrate 23 includes an air blower drive unit. The air blower drive unit drives the third air blower 21 and the fourth air blower 22, and includes power devices. The indoor unit 51a does not include the compressor 6. The functional units other than the first air blower 2, the second air blower 3, the compressor drive substrate 8, and the compressor 6 are provided in the indoor unit 51a in a similar manner to the outdoor unit 50. The third air blower 21 blows air on the heat exchanger 9. The cooling fin 4 cools the power devices of the air blower drive unit. The fourth air blower 22 is installed on the left side of the third air blower 21 and blows air on the heat exchanger 9. Moreover, the third air blower 21 and the fourth air blower 22 blow air on the cooling fin 4. The air temperature detection unit 11 detects the temperature of the air drawn in by the indoor unit 51a.

In the first embodiment, the outside temperature is used to determine the positions of the air blowers; however, in the position determination operation for the air blowers in the second embodiment, the suction temperature of the air drawn in by the indoor unit 51a is used instead of the outside temperature. The relationship between the determination temperature A and the temperature of the air drawn in by the indoor unit 51a is the same as the relationship between the determination temperature A and the outside temperature Ta in the first embodiment. The position determination operation other than the operation of comparing the determination temperature A with the temperature of the air drawn in by the indoor unit 51a is similar to that in the first embodiment.

The determination may be made by using, instead of using the suction temperature of the indoor unit 51a, the refrigerant pipe temperature with which a similar effect can be obtained. Functions as a condenser and an evaporator in the indoor unit 51a are opposite to those in the outdoor unit. Thus, when the air conditioner 100 is set to cooling mode, the temperature of the liquid connection pipe 53 is lower than the outside temperature. Thus, the outside temperature Ta and the determination temperature A have an inverse relationship as illustrated in FIG. 5. When the air conditioner 100 is set to heating mode, the temperature of the liquid connection pipe 53 is higher than the outside temperature. Thus, the outside temperature Ta and the determination temperature A have a direct relationship as illustrated in FIG. 6. The cooling fin 4 may be disposed not to project into the air blower chamber, and the configuration may be such that the cooling fin 4 is cooled by the air drawn from the machine chamber side through a duct by any of the air blowers installed in the air blower chamber. Alternatively, the configuration may be such that an electrical item is surrounded by metal plates and is cooled by directly applying the air blown from the air blower to the metal plates.

As described above, in the present embodiment, in the indoor unit 51a of the air conditioner including a plurality of air blowers, the position of the air blower for blowing air on the cooling fin 4 can be regularly determined. Thus, even when the air blowers of the indoor unit 51a are replaced and, as a result, the positions of the third air blower 21 and the fourth air blower 22 are reversed, the positions of the air blowers can be determined and it is possible to switch control between the air blowers. Moreover, even when a plurality of air blowers are individually controlled, the power devices can be cooled. Consequently, the reliability of the power devices of the air blower drive unit can be prevented from degrading. Therefore, reduction in air-conditioning capacity of the air conditioner can be inhibited.

The configurations illustrated in the above embodiments merely illustrate examples of the content of the present invention, and can thus be combined with another known technique or partially omitted and/or modified without departing from the scope of the present invention.

The invention claimed is:

1. An outdoor unit comprising:
a heat exchanger to exchange heat between refrigerant and air;
a first air blower and a second air blower to blow air on the heat exchanger;
compressor drive circuitry to drive a compressor compressing the refrigerant, the compressor drive circuitry including a power semiconductor device;
a cooling fin to cool the power semiconductor device;
a cooling-fin-temperature detector to detect temperature of the cooling fin;
position determination circuitry to determine a position of the first air blower and a position of the second air blower by using the temperature of the cooling fin; and
an air temperature detector to detect outside air temperature, wherein
when an amount of change of the temperature of the cooling fin after only the first air blower of the first air blower and the second air blower is operated after the compressor enters a stopped state is larger than a threshold, the position determination circuitry determines that the first air blower is located at a position closer to the cooling fin than the second air blower, and
the threshold changes in accordance with the outside air temperature.

2. An outdoor unit comprising:
a heat exchanger to exchange heat between refrigerant and air;
a first air blower and a second air blower to blow air on the heat exchanger;
compressor drive circuitry to drive a compressor compressing the refrigerant, the compressor drive circuitry including a power semiconductor device;
a cooling fin to cool the power semiconductor device;
a pipe temperature detector to detect temperature of a refrigerant pipe connected to the heat exchanger;

position determination circuitry to determine a position of the first air blower and a position of the second air blower by using the temperature of the refrigerant pipe; and an air temperature detector to detect outside air temperature, wherein when an amount of change of the temperature of the refrigerant pipe after only the first air blower of the first air blower and the second air blower is operated after the compressor enters a stopped state is larger than a threshold, the position determination circuitry determines that the first air blower is located at a position closer to the cooling fin than the second air blower, and the threshold changes in accordance with the outside air temperature.

3. An indoor unit comprising:

a heat exchanger to exchange heat between refrigerant and air;

a first air blower and a second air blower to blow air on the heat exchanger;

air blower drive circuitry to drive the first air blower and the second air blower, the air blower drive circuitry including a power semiconductor device;

a cooling fin to cool the power semiconductor device;

a cooling-fin-temperature detector to detect temperature of the cooling fin;

position determination circuitry to determine a position of the first air blower and a position of the second air blower by using the temperature of the cooling fin; and an air temperature detector to detect suction temperature, wherein when an amount of change of the temperature of the cooling fin after only the first air blower of the first air blower and the second air blower is operated is larger than a threshold, the position determination circuitry determines that the first air blower is located at a position closer to the cooling fin than the second air blower, and the threshold changes in accordance with the suction temperature.

4. An indoor unit comprising:

a heat exchanger to exchange heat between refrigerant and air;

a first air blower and a second air blower to blow air on the heat exchanger;

air blower drive circuitry to drive the first air blower and the second air blower, the air blower drive circuitry including a power semiconductor device;

a cooling fin to cool the power semiconductor device;

a pipe temperature detector to detect temperature of a refrigerant pipe connected to the heat exchanger;

position determination circuitry to determine a position of the first air blower and a position of the second air blower by using the temperature of the refrigerant pipe; and an air temperature detector to detect suction temperature, wherein when an amount of change of the temperature of the refrigerant pipe after only the first air blower of the first air blower and the second air blower is operated is larger than a threshold, the position determination circuitry determines that the first air blower is located at a position closer to the cooling fin than the second air blower, and the threshold changes in accordance with the suction temperature.

5. An air conditioner comprising:

the outdoor unit according to claim 1; and an indoor unit connected to the outdoor unit via a refrigerant pipe.

6. An air conditioner comprising:

the outdoor unit according to claim 2; and an indoor unit connected to the outdoor unit via a refrigerant pipe.

7. An air conditioner comprising:

the indoor unit according to claim 3; and an outdoor unit connected to the indoor unit via a refrigerant pipe.

8. An air conditioner comprising:

the indoor unit according to claim 4; and an outdoor unit connected to the indoor unit via a refrigerant pipe.

9. The outdoor unit according to claim 1, wherein the threshold is an amount of change in the temperature of the cooling fin obtained by subtracting the temperature of the cooling fin before the compressor operates from the temperature of the cooling fin after the compressor operates for a predetermined period of time.

10. The outdoor unit according to claim 1, wherein the threshold is lower in a case when the outside temperature is high than in a case when the outside temperature is low.

* * * * *